No. 794,031. PATENTED JULY 4, 1905.
J. E. LEHMAN.
TIRE GAGE.
APPLICATION FILED MAY 3, 1905.
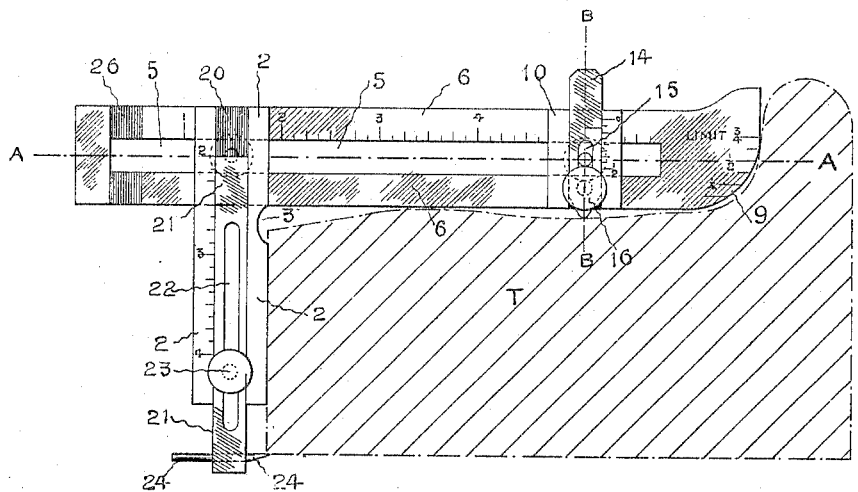
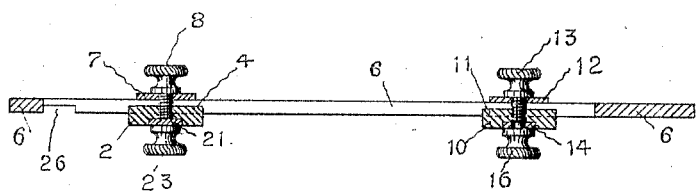
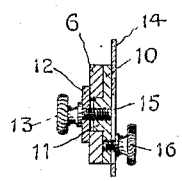
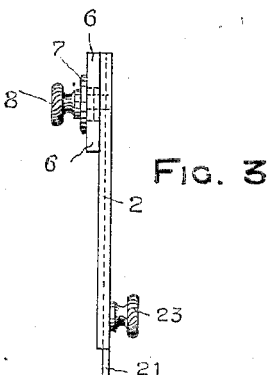
WITNESSES,
John J. Schrott.
F. C. Gibson.
INVENTOR
Jay E. Lehman
per
Fred G. Dieterich
ATTORNEY.

No. 794,031.

Patented July 4, 1905.

UNITED STATES PATENT OFFICE.

JAY E. LEHMAN, OF REVELSTOKE, CANADA.

TIRE-GAGE.

SPECIFICATION forming part of Letters Patent No. 794,031, dated July 4, 1905.

Application filed May 3, 1905. Serial No. 258,731.

*To all whom it may concern:*

Be it known that I, JAY E. LEHMAN, a citizen of the United States of America, residing in the city of Revelstoke, in the Province of British Columbia, Canada, have invented a new and useful Improvement in Tire-Gages, of which the following is a specification.

My invention relates to a gage whereby the wear of a railway-wheel tire may be determined that it may be ascertained whether the limit wear of tread or flange is approached or has been exceeded; and my object has been to obtain such measurements in a convenient and accurate manner from a position which is not affected by the wear of the tire. The difficulty experienced heretofore with such gages has been that as the whole outer diameter of the tire, whether of flange or tread, is to a greater or less extent subject to wear no part of such outer diameter affords a satisfactory base from which to measure the wear and, further, that the gages hitherto used have not been susceptible of application to tires of various dimensions, nor have they been designed to ascertain on one gage the wear of the flange and the wear of the tread of the wheel. I have therefore designed my gage that the wear may be measured from a member which projects across the width of the tire square to a member which may be set against the outer face of the tire-rim, which is to be regarded as the base on which the gage is set to insure the correct position of it in relation to the tire. The end of the member which projects across the width of the tire is rounded to a radius indicating the limit of wear which is permissible on the fillet of the flange, and slidable along the length of this member is a depth-gage by which the wear of the tread of the wheel may be determined at any desired position across the width of the tire.

The particular construction and application of the gage is fully described in the following specification and illustrated in the drawings which accompany it, in which—

Figure 1 is a front elevation of the gage, showing its application to the cross-section of a flanged tire; Fig. 2, a section through the gage on the line A A in Fig. 1; Fig. 3, an end elevation from the left-hand side, and Fig. 4 is a section on the line B B in Fig. 1.

In the drawings, T represents the cross-section of a flanged tire to which the gage is shown as applied.

2 is the base member designed to be applied to the outer face of the tire and having a portion 3 removed to clear any turned-over or ragged corner edge. Across the back of 2 toward its upper end a portion 4 projects, (see Fig. 2,) the edges of which are square to that edge of 2 which is designed to be set against the outer face of the tire, and this projection 4 slidably fits into an elongated slot 5, extending throughout the greater part of the length of a cross member 6, which is long enough to reach across the width of a railway-wheel tire, whether flanged or otherwise. The cross member 6 is retained in slidable contact with the face of the base member 2 and may be clamped in any desired lengthwise position in the slot 5 by a washer 7 and milled head-screw 8, applied at the back. The lower corner of the extreme outer end of 6 is rounded, as at 9, to a curvature representing the limit of wear permissible on the fillet of the tire-flange, and the edge of this curve 9 is graduated to facilitate the location of the wear of the flange it may be set against. The edge of the base member 2 being set against the outer face of a tire in the manner indicated in Fig. 1 and the screw 8 slackened, the member 5 may be extended until its end contacts with the flange and the condition of the wear of the fillet determined. Slidably movable in the same slot 5 of the cross member 6 is a gage-block 10, having a backward projection 11 to engage the edges of the slot, and this gage-block is retained against the face of 6 and may be clamped in any desired position along the slot 5 by a washer 12 and milled head-screw 13 in the same manner as is used to secure the cross member 6 to the base member 2. Vertically slidable in a recess in the face of this block 10 is a gage member 14, having an elongated slot 15 to permit of endwise movement on the milled head-screw 16, by which the gage member may be secured to the block. The gage-block may thus be traversed along the bar 6 across the width of the tire opposite to the greatest wear of the tread, and being clamped there by the screw 13 the gage member 14 may be pushed down to contact with the tire and be secured by the screw 16.

Slidable lengthwise in a recess 20 in the face of the member 2 is a gage-slide 21, having an elongated slot 22 to clear the milled head-screw 23, by which it may be clamped in any desired position of extension, and at the lower end of this slide 21 is a gage-point 24, slidable in a drilled aperture across the end of 21, the end of the slide being split to afford a resilient frictional grip to the gage-point 24. The gage member 21 may thus be extended out of the base member 2 and the gage-point 24 set to the joint of the inner diameter of the tire.

To facilitate the determination of the position of the wear, the face of the bar 6 may be graduated, as shown in Fig. 1, and the faces of 2 and 10 may be similarly graduated along the edge of the gage-slide recesses, so that the depth of wear below the face of the tire will be indicated by the graduations of 10, and the extreme thickness of the tread of the tire will be indicated by the graduations of 2, and on the former measurement being deducted from the latter the minimum thickness of the wheel-tread may be ascertained.

Across the face of 6 at the termination of its groove 5 is a shallow recess 26, designed to receive the cross projection 4 of the member 2 and permit it to be secured along the member 5 for greater convenience of portability when the gage is not in use.

In addition to the general convenience of this gage and the facility by which measurements may be determined by it an important feature in its design is that the measurements of wear are determined from a base which is unaffected by the wear of the wheel, and therefore reliable. Fillet-gages for determining the wear of the flange are frequently ineffectual by reason of the fact that they cannot conveniently be applied square to the plane of rotation of the wheel.

Having now particularly described my invention and the manner of its use, I hereby declare that what I claim as new, and desire to be protected in by Letters Patent, is—

1. In a wheel-tire gage; the combination with a base member designed to be set against the outer face of a wheel-tire, of a cross-bar laterally extensible therefrom at right angles to the contacting edge of the base member, a gage-block endwise slidable along the cross-bar, and a depth-gage slidable on the block at right angles to the edge of the cross-bar.

2. In a tire-gage; the combination with a base member designed to be set against the outer face of the wheel-tire, of a gage-bar endwise slidable in relation to the base member in a direction parallel to its contacting edge and having a gage-point endwise slidable across its end at right angles to the direction of its movement, a cross-bar slidable across the upper end of the base portion at right angles to the contacting edge thereof the extreme lower corner of which is rounded to the smallest permissible curve of wear of a wheel-flange, and a gage-block slidable along the cross-bar having a gage member slidable on the block at right angles to the edge of the bar.

3. In a tire-gage; the combination with a base member designed to be set against the outer face of a wheel-tire, of a cross-bar laterally extensible from the base member at right angles to it, means for clamping the cross-bar to the base member at any desired position of lateral extension, a gage-block slidable along the cross-bar having a gage member slidable in the block at right angles to the edge of the bar, means for clamping the gage-block to the bar, and means for clamping the gage member to its block.

4. In a tire-gage; the combination with a base member the edge of which is designed to be set against the outer face of a wheel-tire, of a gage-bar endwise slidable in relation to the base member in a direction parallel to its edge of contact on the tire and having a gage-point endwise slidable across its end, graduations to indicate the amount of extension of the gage-bar in the base portion, a graduated cross-bar slidable across the upper end of the base portion at right angles to the contacting edge thereof the extreme lower corner of which is rounded to the smallest permissible curve of wear of the tire-flange and is graduated on such curve from the under edge of the bar, and a gage-block slidable along the cross-bar having a gage member slidable in the block at right angles to the edge of the bar, the gage-block having graduations to indicate the movement of the gage-bar in relation to the block.

In testimony whereof I have signed my name to this specification in the presence of two subscribing witnesses.

JAY E. LEHMAN.

Witnesses:
ROWLAND BRITTAIN,
ELLICE M. WEBBER.